United States Patent [19]
Methfessel et al.

[11] Patent Number: 5,593,352
[45] Date of Patent: Jan. 14, 1997

[54] MOBILE GROUND LEVEL SKYDIVING APPARATUS

[76] Inventors: Harley A. J. Methfessel, 6011 Union Springs Ct.; Terry L. Langston, 6010 Union Springs Ct., both of Clifton, Va. 22024

[21] Appl. No.: 288,724

[22] Filed: Aug. 15, 1994

Related U.S. Application Data

[63] Continuation-in-part of Ser. No. 202,582, Feb. 28, 1994, abandoned.

[51] Int. Cl.⁶ ..................................... A63G 31/12
[52] U.S. Cl. ................. 472/50; 472/3; 472/134; 434/258; 73/147
[58] Field of Search .................. 472/3, 50, 59, 472/67, 68, 60, 57, 75, 136, 137, 134; 434/34, 247, 258; 52/79.5; 73/147

[56] References Cited

U.S. PATENT DOCUMENTS

| | | |
|---|---|---|
| 979,681 | 12/1910 | Mauch . |
| 3,468,533 | 9/1969 | House, Jr. . |
| 3,484,953 | 12/1969 | Norheim, Jr. . |
| 4,122,934 | 10/1978 | Nieto de Moreno . |
| 4,457,509 | 7/1984 | St. Germain . |
| 4,487,410 | 12/1984 | Sassak . |
| 4,545,574 | 10/1985 | Sassak . |
| 4,578,037 | 3/1986 | Macangus et al. . |
| 4,700,565 | 10/1987 | Albuschkat . |
| 4,958,874 | 9/1990 | Hegedus . |
| 4,997,060 | 3/1991 | Sassak . |
| 5,046,719 | 9/1991 | Comstock et al. . |
| 5,209,702 | 5/1993 | Arenas . |

*Primary Examiner*—Kien T. Nguyen
*Attorney, Agent, or Firm*—Kerkam, Stowell, Kondracki & Clarke, P.C.; John C. Kerins

[57] ABSTRACT

A mobile, transportable ground level skydiving simulator apparatus is provided that includes a collapsible air containment unit for directing air upwardly therethrough to enable a user or users to be supported by the airstream in simulating skydiving activities. The air containment unit is provided on a movable platform, such as a flatbed trailer, with all or substantially all components of the apparatus being mounted thereon or capable of being stored thereon in transit. The various elements, but in particular the air containment unit, are of a design that enables quick and efficient breakdown or disassembly of the components for transport with the apparatus on roads and highways, and which enables quick and efficient assembly of the components into an operable structure at successive locations.

28 Claims, 6 Drawing Sheets

MOBILE GROUND LEVEL SKYDIVING APPARATUS

This application is a continuation-in-part of application Ser. No. 08/202,582, filed Feb. 28, 1994 now abandoned.

BACKGROUND OF THE INVENTION

1. Field of the Invention

The present invention relates to skydiving simulators, and more particularly to a skydiving simulator apparatus that is designed and constructed to be mobile and portable, and that is designed to operate from substantially ground level employing a readily assembled air containment unit.

2. Description of Related Art

An apparatus for simulating a free-fall through the air has heretofore been disclosed in U.S. Pat. No. 3,484,953, issued to Norheim, Jr. That apparatus employs a permanently installed, rigid vertical duct as the chamber into which a person enters and is subjected to an upwardly flowing air stream. The apparatus in that patent further discloses the use of a recirculating air stream that employs ducting constructed not only above the vertical duct, but also below the vertical duct in a subterranean installation.

In addition, the apparatus in the Norheim, Jr., patent contemplates having a staircase constructed as part of the apparatus to access an entry opening disposed at the upper end of the vertical duct. All of the above features, while possibly desirable in improving certain aspects of operation and ease of use, limit the apparatus to a fixed, permanent location. Thus, while the patent suggests that the apparatus may be used as an amusement device, in addition to or instead of being used as a training device, its use as an amusement device is restricted to permanent locations such as theme parks or the like.

In recent years, the increasing popularity of school vacations such as "spring break" and "beach week" at various beaches and resorts, which are attended by college and/or secondary school students, has led various consumer product companies, and various entertainment networks and corporations, to promote their products or services through sponsored events at the beaches and resorts. Many of these events involve some sort of recreational or amusement activity. Other promotional and non-promotional events in which amusement devices are employed take place at various times throughout the country, for example, at sporting events, county fairs, festivals, carnivals, and project or business openings.

In most instances, events of this type last only for a limited number of days, and the locations for these events are normally locations that are used for numerous purposes throughout the course of the year. For these reasons, it would be impractical from a cost and land availability standpoint to install a skydiving simulator such as the one disclosed by Norheim et al. at each of the various locations where such promotional or non-promotional events of this type are conducted.

Other patents directed to skydiving or freefall simulators include U.S. Pat. No. 4,457,509, to St. Germain; U.S. Pat. No. 4,578,037, to Macangus et al.; and U.S. Pat. No. 4,700,565 to Albuschkat. None of these patents has all of the advantages provided by the present invention, as will be discussed in greater detail below.

It is a principal object of the present invention to provide a skydiving simulator apparatus having one or more features that permit the apparatus to be readily moved from one location to another and to be readily erected at successive locations, so as to reach a larger audience in conducting a series of promotional events, and/or to enable a skydiving-type amusement device to be readily provided at various non-promotional events, such as county fairs.

It is a further object of the present invention to provide a skydiving simulator apparatus whose design permits the simulator to be essentially self-contained and self-transportable, thereby facilitating moving the simulator from event to event.

It is another object of the present invention to provide a skydiving simulator apparatus whose design permits the apparatus to be packaged as an essentially self-contained mobile unit whose dimensions permit the mobile unit to travel on interstate highways and state roads and highways, thereby facilitating moving the apparatus from one location to another in an economical manner.

It is an additional principal object of the present invention to provide a mobile, skydiving-type amusement device that has large, highly visible surfaces that readily accept advertising or promotional media thereon, permitting the device to function as both an amusement device and a promotional device.

SUMMARY OF THE INVENTION

The above and other objects of the present invention are achieved in the present invention by providing a mobile, ground-level, skydiving apparatus that has a collapsible air containment unit that, when erected, serves as the chamber within which a person would experience a simulation of a skydiving freefall. The air containment unit is mounted or is mountable on a flatbed trailer or a "lowboy", which units are commonly transported on the roads and highways across the country.

One version of a suitable air containment unit is an inflatable cylindrical tube having a containment netting extending across an upper extent of the tube, with the tube secured at its lower end to a flooring element that has a sufficient amount of intermittent open space to permit the required volumes of air to pass through the tube, but which also provides a barrier between a person disposed within the air containment unit and the portion of the device (normally the fan itself) disposed below the floor and underneath the air containment unit. An inflatable air containment unit would also normally employ guy wires and/or other support or stabilizing means to maintain the air containment unit in a substantially upright vertical position once the apparatus is erected at the desired site.

The air containment unit is made of a transparent material, in order to permit onlookers to view the activity inside the unit. In addition, the air containment unit, once erected, provides a large, prominent surface on which advertising or promotional media, such as corporate logos of event sponsors, may be presented.

The apparatus is provided with a fan system, also installed on the trailer or lowboy, which is used for generating the airflow that is to be directed through the air containment unit to provide the upward flow of air necessary to suspend the user above the floor of the air containment unit. The fan system is driven by a diesel engine also provided on the flatbed, by way of a suitable drive train. Alternatively, it may prove to be feasible to drive the fan system from the output of the diesel engine of the tractor used to transport the flatbed trailer or lowboy, in order to avoid the necessity of providing a separate power plant to operate the simulator apparatus.

The skydiving simulator apparatus may employ an "open" air system, wherein there is no recirculation of the air being moved through the air containment unit, or may optionally employ a "closed" air system, in which air blown through the air containment unit is recirculated, in whole or in part. The closed system would likely add to the complexity and mass of the structure, and therefore, the closed system might prove to be of some benefit only if it is found to be desirable to condition the air travelling through the air containment unit.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment taken in conjunction with the accompanying drawings wherein like reference characters represent like parts throughout the several views.

DETAILED DESCRIPTION OF THE PREFERRED EMBODIMENT

Figure 1:
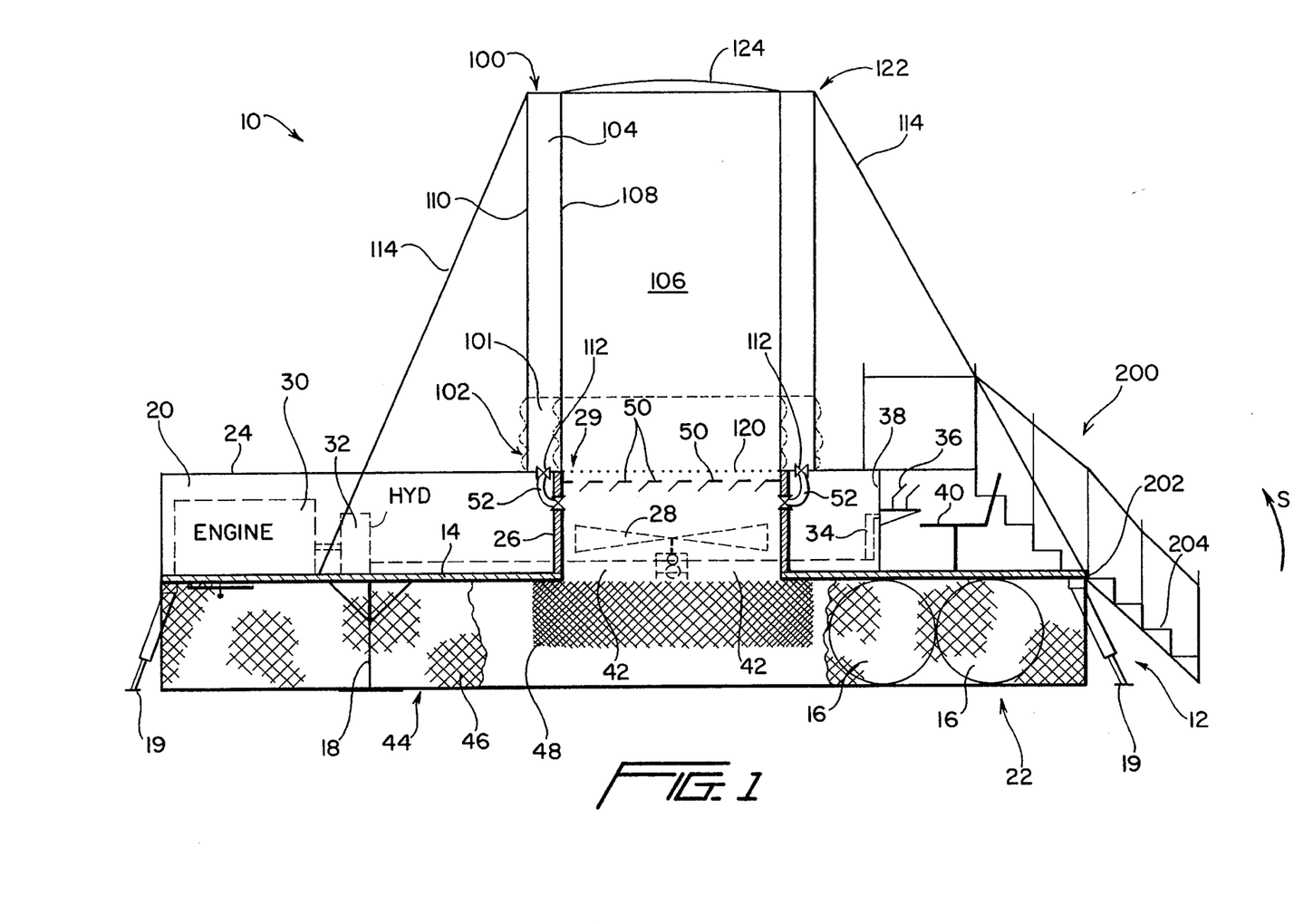
FIG. 1 is a substantially schematic elevation view of the mobile ground level skydiving apparatus in accordance with a preferred embodiment of the present invention.

A preferred embodiment of the mobile ground level skydiving apparatus 10 will be described by referring initially to FIGS. 1–3. In FIG. 1, the apparatus 10 is shown as being incorporated onto a flatbed trailer 12, that, as is well known in the art, is adapted to be transported by a tractor in a tractor-trailer tandem. The horizontal surface 14 of the flatbed trailer is employed as a platform onto which the apparatus is constructed.

Shown at the underside of flatbed trailer 12 in FIG. 1 are wheels 16 and an integral jack stand 18 that maintain the flatbed in a horizontal elevated position when the tractor is decoupled from the trailer at a particular stop. These features are well known in the flatbed trailer art, and further elaboration with respect to details of operation of those features is not necessary.

An enclosure 20 is preferably constructed above, and is secured to the horizontal surface 14 of, the flatbed, covering all but the rear portion 22 of the flatbed trailer. The enclosure 20 serves several purposes, a first of which is to provide an elevated deck 24 above which the air containment unit 100 is to be disposed. It is desired to have the lower end or base 102 of the air containment unit 100 elevated in this manner so as to make the unit more readily visible, thus improving the ability of the apparatus to attract crowds. Thus, while the horizontal surface of the flatbed will generally be on the order of 3–5 feet above ground level, the elevated deck 24 of the enclosure 20 will provide a base surface preferably at a height between about 6–10 feet above ground level.

The enclosure 20 also preferably has a vertical cylindrical fan housing 26 constructed therein to channel air flow produced by a fan 28 upwardly through the air containment unit 100, as will be discussed in further detail later. The cylindrical fan housing 26 is positioned immediately above an opening 42 in the horizontal surface of the flatbed trailer, and terminates at a corresponding opening 29 in the surface of the deck 24. The enclosure 20 also provides a large volume of space in which a power plant, shown schematically as engine 30 in FIG. 1, may be disposed. The drive train, shown in FIG. 1 as hydraulic system 32, which converts the power plant output to drive the fan 28, is also preferably housed within enclosure 20. Substantially all of the connection hardware, cabling, and the like, can also be run within enclosure 20, giving the apparatus a neat and clean appearance. A fuel tank 31 (see FIG. 3) may also be provided within the enclosure to provide a substantially self-contained power and drive system for the unit.

Operator control lines 34 preferably extend within enclosure 20 to the rear portion 22 of the flatbed trailer. An operator control console 36 is provided on the rear vertical wall 38 of the enclosure 20 (see also FIG. 3), and an operator's chair 40 is also provided to enable the operator to sit and operate the controls on the control console 36. The use of various controls for the apparatus will be discussed in further detail later in the specification.

Also at the rear portion 22 of the trailer, a set of access stairs 200 is provided, which extends from ground level to the operator's station, and which further extends upwardly beyond the operator's station, at one side thereof (see FIG. 3), providing access to deck 24. The users of the apparatus may thus gain access to the air containment unit, in which the skydiving or free-fall is simulated, by way of stairs 200. It is preferred that the set of stairs 200 be foldable or collapsible such that the set of stairs can be moved and stowed at a position above the platform 14 when the apparatus is configured in its transport mode. A foldable set of stairs is schematically depicted in FIGS. 1 and 3, as including hinge pin 202, about which the lower portion 204 of the set of stairs is rotated (as indicated by arrow S) between the access position shown in FIGS. 1 and 3 and a stowed position (not shown).

A fan 28 is mounted within enclosure 20, and preferably spans the entire opening 42 in the horizontal surface 14 of the flatbed trailer. The fan 28, which is preferably a propeller-type fan with variable pitch capability, is disposed such that the blades rotate in a horizontal plane to blow air upwardly. The exhaust side of the fan is in fluid communication with the open volume in the air containment unit. It is the airflow generated by this fan 28 that, when propelled upwardly through the air containment unit, lifts and/or suspends a user or users positioned inside the air containment unit in air, thus simulating a skydiving or freefall experience.

It is not essential that a variable pitch fan design be used, and it will be readily apparent to those of ordinary skill in the art that other means for controlling air flow speed can be employed which would obviate the need for a variable pitch fan. In addition, other fan designs, such as turbofans and counter-rotating fans, may be employed in this apparatus to produce the lifting airstream.

The fan housing 26 ensures that the airflow is channeled upwardly into air containment unit 100, which, in the depicted preferred embodiment, is secured to deck 24 at a position directly above the fan 28 and is sealed thereto, surrounding opening 29. The air containment unit is preferably sealed to the deck in the sense that an airtight fastening is achieved, and the term "sealed" is not meant to imply a substantially permanent attachment of the unit 100 to deck 24.

It should also be readily understood that it would be possible to alternatively employ a fan that is not disposed directly below unit 100, such as a vertically oriented fan, used in conjunction with appropriate ducting, to channel the airflow upwardly into the air containment unit 100. In addition, it would be possible to employ a horizontally oriented fan not placed directly under the air containment unit, and there may be circumstances for which an offset fan placement of this type would be appropriate. In such a configuration, it will be readily apparent that suitable ducting, and possibly directional louvers, may be provided to direct the air stream driven by the fan into the air containment unit.

Because, in operation, there will be a person or persons disposed within air containment unit 100, the air being drawn in by the fan 28 must be substantially free of debris and other solid substances which could strike or impinge upon the person within the tube, and also cause damage to the fan. In the embodiment depicted in FIG. 1, a two-stage filtering process is employed to separate debris and other solids from the air being drawn by the fan. A first stage filter 44, shown partially in cutaway view, that will prevent all significant debris from entering the fan intake, may preferably be a flexible mesh fabric skirt 46, having a partially open pattern, disposed around the entire periphery of the flatbed trailer. The skirt, in addition to serving as a filter for debris, will advantageously be used to display what will be termed herein as information media, such as logos and/or slogans of corporate sponsors, or any other message or the like to be viewed by onlookers. The skirt should therefore preferably be made of a material which will readily accept the information media.

The skirt 46 could alternatively be made from substantially rigid frames having a fine metal screening spanning the frame, or from wooden lathework panels having a cross-hatched open pattern, either of which may be hinged to fold up against enclosure 20 when the apparatus is not in use and/or is in transport. The screens or lathework may alternatively be provided as separate structures employing one of the many known types of quick-attach connectors.

The skirt 46 preferably extends substantially the entire distance between the horizontal surface 14 of the trailer and the ground, so as to leave no large areas through which large pieces of debris may pass, thus maximizing its ability to serve as a filter. The skirt 46 shown in FIG. 1 extends vertically downwardly from surface 14 of the trailer into contact with or in close proximity to the ground.

Figure 5:
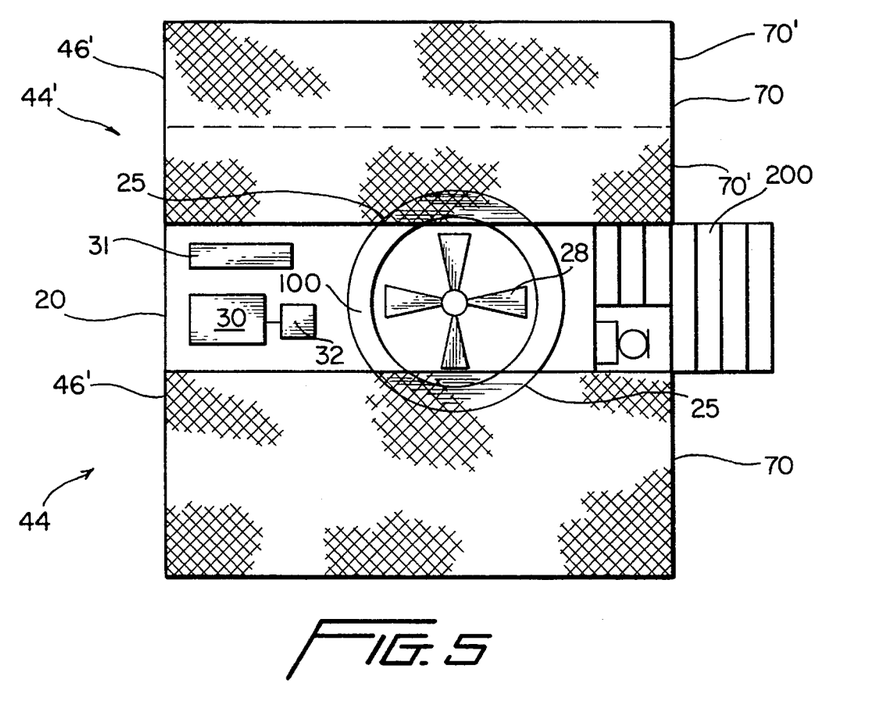
FIG. 5 is a substantially schematic top plan view of the mobile ground level skydiving apparatus having an alternative/preferred embodiment of a first stage filter.
Figure 6:
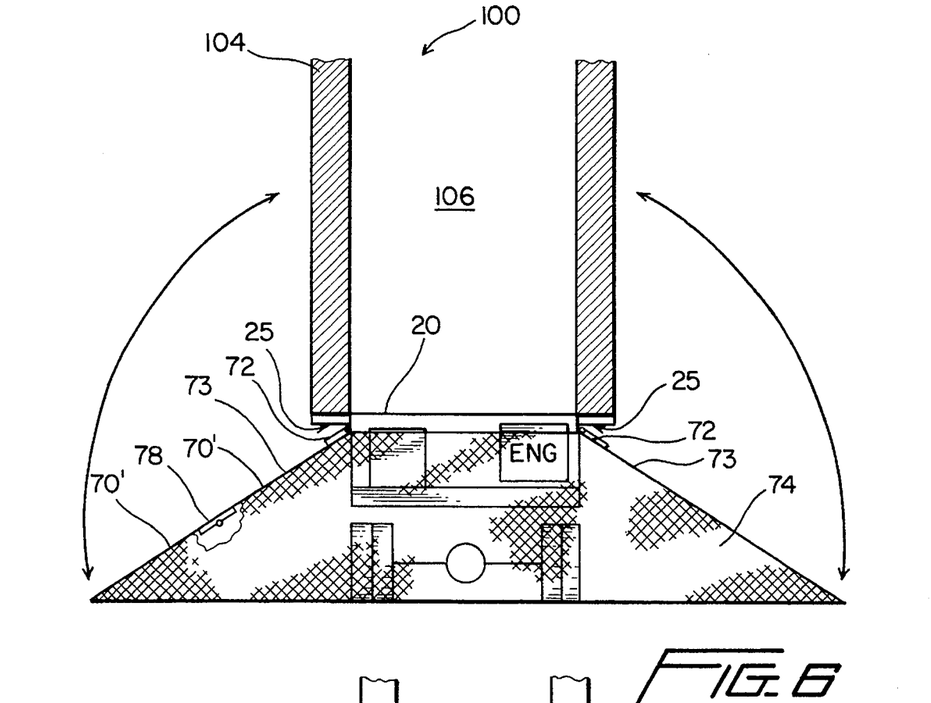
FIG. 6 is a substantially schematic side elevation view of the apparatus of FIG. 5.
Figure 7:
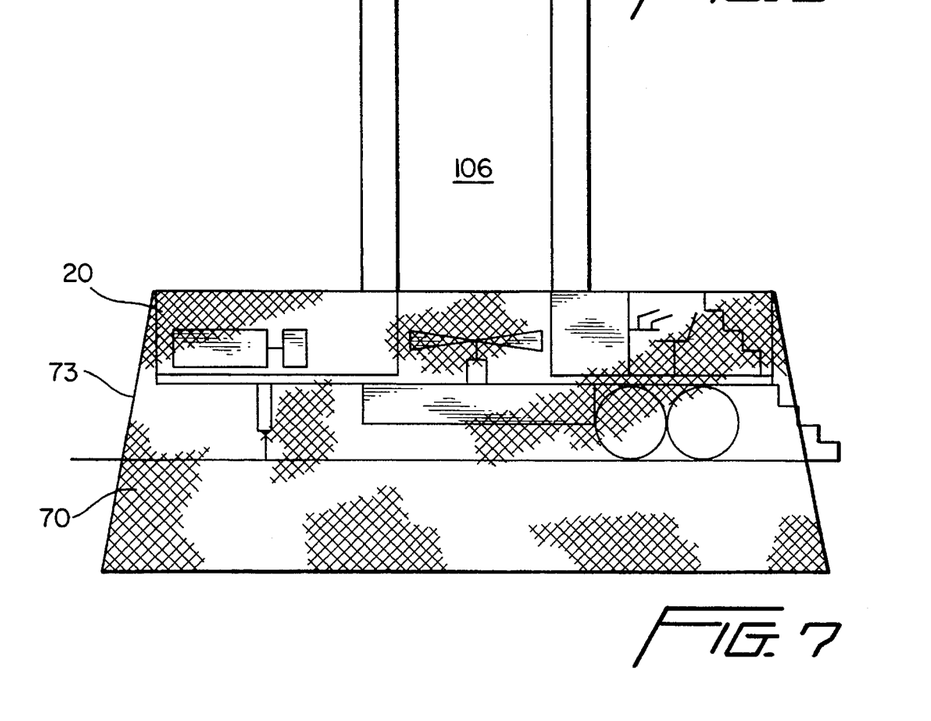
FIG. 7 is a substantially schematic front elevation view of the apparatus of FIG. 5, featuring the alternative preferred embodiment of the first stage filter.

As best seen in FIGS. 5, 6 and 7, it is preferred, however, that the first stage filter 44', comprising skirt 46' be of a length much greater than the vertical distance from the ground to the horizontal surface 14 of the trailer. The long skirt 46' is desired in order to have the skirt 46', when in operating position, extend from the trailer to the ground on a slant or at a sloping angle, providing the first stage filter 44' with a large surface area for the fan 28 to draw air through.

In the preferred embodiment of FIGS. 5, 6, and 7 skirt 46' comprises a plurality of main panels 70 (two shown) connected to enclosure 20, preferably at or adjacent to the elevated deck 24, as by hinges 72 (FIGS. 6, 8) about which the panels 70 can be rotated, or by conventional quick-attach connectors or other connecting means. Having the skirt 46' connected to the enclosure 20 at the highest practicable height enables the use of a longer skirt having an increased surface area to reduce system power requirements, while maintaining the "footprint" of the apparatus 10 as small as possible. The increased surface area of this first stage filter 44', comprising skirt 46', as compared with a skirt extending from surface 14 perpendicular to the ground, increases the available area through which air will be drawn and thus reduces the power output requirements of the power plant, depicted as engine 30 in FIG. 1, which drives fan 28.

An auxiliary panel 74 (FIG. 6) is preferably provided to span and cover the open area between panels 70 across the side of the apparatus 10 (which is the front of the trailer). The panel 74 may be constructed of a filtering media such as are panels 70, to provide further filtering surface area. It may be preferable to employ a flexible mesh material for panel 74, which can be secured to panels 70 along the edges 73 thereof.

At the opposite side of the apparatus 10, at the rear of the trailer, either a filtering panel 74 or a solid (air-impervious) panel may be employed to span the opening formed between panels 70.

As noted above, when the panels 70 are constructed of wooden (or other material) lathework or have a rigid frame, the connection of the panels 70 to enclosure 20 is preferably effected by hinges. When the skirt panels 70 are constructed of a flexible mesh, the connection to enclosure 20 may be effected by providing eyelets along an edge of the mesh material, permitting mating with hooks, clips or similar fasteners disposed on enclosure 20, for example, or permitting the skirt to be lashed against enclosure 20 with rope. Suitable ground anchors, such as stakes, can be employed to retain a distal end 76 of the panels 70 at the desired position. If the skirt panels 70 are constructed of lathework, or have rigid frames, the weight of the panels themselves can generally hold the skirt in operating position (FIG. 6) at ground level, however, additional anchoring may be used if desired.

Figure 8:
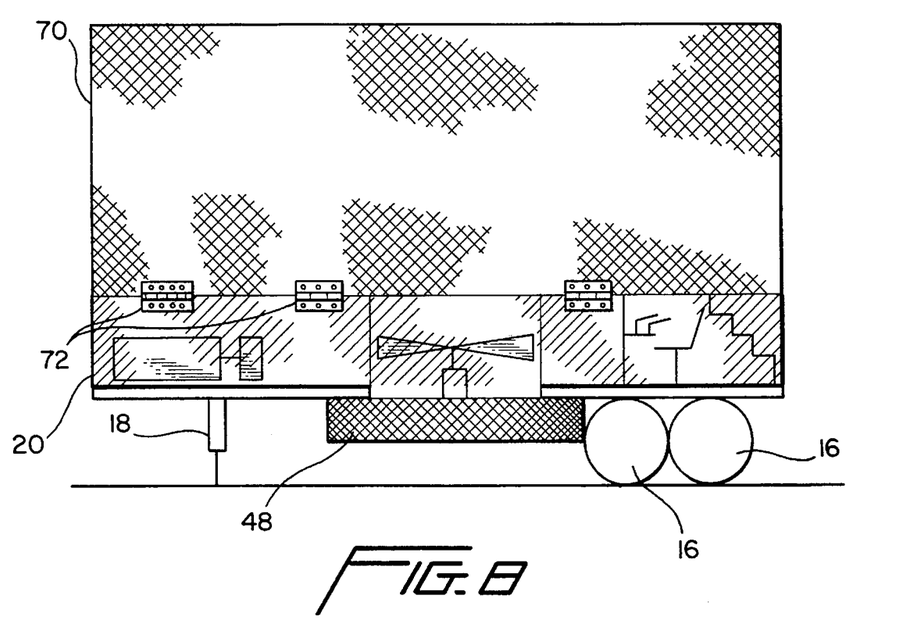
FIG. 8 is a substantially schematic front elevation view of the apparatus of FIG. 5, with the first stage filter disposed in its transport mode.

FIG. 8 illustrates the apparatus 10 on which a skirt 46' having panels 70 made of lathework or employing a rigid frame is in its transport or mobile position. In FIG. 8, the panels 70 of skirt 46' have been pivoted around the hinges 72, or other means connecting the skirt panels to enclosure 20, such that the panels extend vertically above the platform, and are preferably canted inwardly. The panels 70 are preferably held in the transport or mobile position by fastening the panels to one another and/or to the deck 20, whereby both panels are urged inwardly toward the center of the trailer.

In the embodiment which uses flexible mesh material as the panels 70 of skirt 46', the mesh material may be folded or rolled up and stowed internally or externally for transport.

As noted previously, it is important to maintain the overall height of the unit, when in its transport mode, within the height limitations commonly encountered on the highways. The flexible mesh material, because it can be folded or rolled up, poses no problem in this respect. In addition, it is not contemplated that the more rigid filter media discussed herein, namely lathework and rigid frame screens, would pose any problem when transported as shown in FIG. 8. However, it would be possible, if transport height proves to be a concern for the rigid filter media, to makes panels 70 of two or more sections 70', which can be joined by hinges 78, as shown with respect to panel 70 on the left side of FIG. 6. This provides essentially the same increased filter surface area, while decreasing the height of the first stage filter 46' under transport conditions.

Immediately below the fan 28, and preferably secured to an underside of the horizontal surface 14 of the flatbed trailer, is a second stage filter 48, provided to serve primarily as a backup filter in the event of failure of the first stage filter and as a safety barrier to prevent inadvertent insertion of hands, feet and the like, in the event that a person enters the area under the platform while the apparatus is in operation.

The second stage filter will thus have larger openings than the first stage filter that will prevent potentially harmful debris and solids from damaging the fan and/or from being blown by the fan 28 into the air containment unit 100, in the event of a failure in the first stage filter. The apparatus is preferably operated over pavement or other hard surface substantially free of loose particles, in order to minimize the chances that particulate matter will be blown upwardly with the air through the air containment unit. Alternatively, if the apparatus is to be set up on a beach, it may be preferable to position a floor covering product, such as artificial turf, on the ground to cover the ground at least within the confines of the first stage filter. The first stage filter is preferably selected to provide suitable filtering for substantially all environments, although it would be possible to select specific filtering media for specific environments.

It is presently contemplated that the second stage filter will preferably include a cage made of expanded metal built directly around the fan unit. However, it is to be noted that either one or both filters may be eliminated if, in the final construction of a particular apparatus, the fan system ends up being positioned at a sufficient distance from the ground so as to effectively avoid the pickup of any debris from the ground, and if the fan system design is such that the safety features of the second stage filter are deemed to not be necessary.

Due to the size of the air containment unit necessary to provide a user or a plurality of users with sufficient space to move around during a simulated free fall, it would not be practicable to provide, on a mobile, transportable skydiving simulator apparatus, a permanent vertical duct of the type shown in the Norheim, Jr., patent, particularly when the apparatus is intended to be transported on the roadways. In the present invention, it is thus contemplated that the air containment unit 100 will be collapsible, such that the unit 100 is not in its operational configuration when being transported, and instead presents a substantially minimal amount, if any, of additional height above deck 24 in a transport configuration. The preferred embodiment of FIG. 1 depicts the air containment unit 100 as being an inflatable, annular containment tube 104 that, when inflated, defines an inner chamber 106 into which the upwardly flowing air from the fan will be channeled such that a person or persons within the inner chamber will be subjected to an airflow of a velocity approximating, and alternatively slightly exceeding and slightly less than, the terminal free fall velocity of that person or those persons.

The inflated containment tube 104, in its operational configuration, is preferably on the order of 12–25 feet in height and approximately 8–10 feet in diameter. The tube 104 in this preferred embodiment will have inner and outer walls 108, 110, respectively, sealed to each other at their upper and lower extremes to enable containment of air between the inner and outer walls in order to maintain the tube 104 in an inflated condition. The tube will preferably have one or more inflation/deflation ports 112, that permit air to be introduced into or released from the tube 104, as desired, to control the inflation and deflation of the tube. The tube 104 is preferably transparent to allow onlookers to view the activity taking place inside the unit.

The inflation of the tube into its operational configuration may be accomplished by introducing air into inflation port 112. The air can preferably be either compressed air from an independent source, or the apparatus can be designed such that air from the fan which normally would flow up through the hollow center of tube 104, can be temporarily diverted into the interior of the tube wall. This airflow diversion can be accomplished by, for example, providing opening 29 with a louver assembly 50, that can be used to temporarily seal off opening 29, and by also providing selectively operable air channels 52 which are coupled between the cylindrical fan housing and the inflation port or ports of the air containment unit.

The inflation ports or valves 112 are to be of a design such that the inflation fluid, once introduced into the volume between walls 108, 110, is retained therein until the ports or valves are operated in reverse to release the fluid to deflate the air containment unit 100. With such a design, the inflation fluid need not be continually supplied to the air containment unit 100 once the air containment unit is inflated. The air containment unit will thus remain inflated until such time as it becomes necessary to collapse the unit for storage and/or transport. The collapsing of the air containment unit, which is preferably made of a transparent, pliant polymer sheet or heavy film, is also a simple operation, principally involving releasing the inflation fluid to atmosphere by opening the inflation ports or valves to atmosphere, and gathering the sheet or film into a desired deflated configuration. A schematic depiction of the collapsed air containment unit 101 can be seen in broken lines in FIG. 1 as well as in FIG. 2.

As noted previously, a principal advantage of the present invention over the apparatus disclosed in, for example, Norheim et al., is that the apparatus is particularly suitable for convenient transport to various locations. Upon reaching a desired destination, the flatbed trailer or lowboy is secured against further movement on the ground. It is believed that the overwhelming majority of locations at which an apparatus of this type would be employed will be sufficiently level so as to permit the apparatus to function properly without a leveling adjustment of the apparatus being necessary. Generally, the tires 16 and jack stand 18 shown in FIG. 1 will provide sufficient adjustment capability to level the apparatus. However, it may be desired to provide further leveling means on the apparatus for leveling the platform 14 and deck 24 to optimize performance of the device, using, for example, hydraulically operated levelers 19, the operation of which will be readily understood in the art.

The deck 24 in the illustrated embodiment is shown as being essentially the same width as the trailer 12, however, it will be possible, and may be desirable in terms of minimizing the width of the apparatus in its transport configuration, to provide deck 24 with deck extenders or extension members 25 (broken lines in FIG. 3, FIG. 5, FIG. 6) which either pull out, or pivot or fold out, from the central portion of deck 24. The extension members permit the use of an air containment unit of a larger cross-sectional dimension than the width of the trailer itself, by providing a wider support platform to support the lower frame of the air containment unit 100. The deck extenders increase the stability of the air containment unit when deployed, and, because they do not increase the width of the trailer in transport mode, do not detract from the transportability or mobility of the apparatus 10.

Once the support platform has been readied at the desired location, including deploying deck extenders 25, where desired, the air containment unit 100 is erected (inflated, in this embodiment), by either the airflow diversion means or by filling with compressed gas from an independent source, as previously discussed. It is preferred, from an overall operational standpoint, that the inflated air containment unit 100 have a stabilizing means, an example of which would be a plurality of guy wires 114 extending from connection points at the upper end of the air containment unit, or from other strategic points along the height thereof, to securing points along the perimeter of the platform 14 or to securing locations on the surrounding surface on which the trailer 12 rests. Other means for stabilizing the air containment unit may also prove to be desirable, and essentially the only constraint on the type of support to be used is that the supports must be capable of being readily assembled and disassembled at various locations, and of being transportable with the overall assembly.

In the depicted preferred embodiment of FIG. 1, the airflow system of the apparatus is an "open" airflow system, in the sense that there is no means provided for capturing and recycling or returning the upwardly flowing airstream to the intake of the fan 28. In this embodiment, air containment tube 104 defines the boundary of air containment unit 100 along the height of the unit, and the unit is bounded at its lower end 102 by flooring means 120, which separates the air containment unit, and thus also persons inside the air containment unit, from the fan assembly. The flooring means is preferably a simple steel grid flooring, such as expanded metal. The flooring means may alternatively be a netting of sufficient strength to support the weight of a person coming to rest on the flooring means. The flooring means 120 may further have variable-opening vents, such as louvers or butterfly valve-type openings, that can be used to aid in controlling the airflow into the inner chamber 106 of the air containment unit. In a preferred embodiment in which a louver assembly 50 is provided as a means to divert air from the inner chamber into air channels 52 to inflate the air containment tube 104, the louver assembly may preferably be constructed to serve as the flooring means 120 as well.

An upper end 122 of the air containment tube is bounded by a retaining net 124, constructed, for example, of the webbing material employed in making seat belts and shoulder harnesses in the automotive industry. The purpose of this retaining net is to assist in maintaining the desired cross-sectional configuration of the air containment tube at the upper end thereof, and, more obviously, to prevent a person undergoing simulated freefall in the unit from being inadvertently propelled out of the inner chamber 106 upon substantial increases in fan speed, or upon the person assuming a position of greatly increased drag.

It would also be possible to design and construct the apparatus of the present invention with a "closed" airflow system, wherein the airstream is captured upon exit from the air containment unit and is channeled or directed back into the intake of fan 28 by suitable ducting. Such a system is, at present, considered to be advantageous only when it is determined to be desirable to condition the air being used when the system is operational.

The air containment tube 104 is preferably constructed of polymer sheet or heavy film that is transparent, in order to allow spectators to view the person or persons inside undergoing simulated freefall. This facilitates the use of the apparatus at promotional events and the like, where there are likely to be a large number of spectators, and where the apparatus is to be used as an attraction for the event. Transparency of the air containment unit is important feature of the invention from that standpoint. The use of a transparent air containment unit will also allow the apparatus to be equipped with an externally mounted camera or a plurality of cameras for taking photographs or videos of the activities taking place in the air containment unit. It is not a requirement, from a purely functional (aerodynamic) standpoint, that the polymer sheet or film be transparent, however.

It is further contemplated that the exterior surface of the air containment tube will be at least partially covered with information media, for example, display or advertising materials of corporate sponsors of events, or with a message or messages of any kind to be displayed to the spectators. The material from which the tube, or other air containment unit configuration, is made is thus preferably a material that readily accepts information media such as print media for display.

Figure 2:
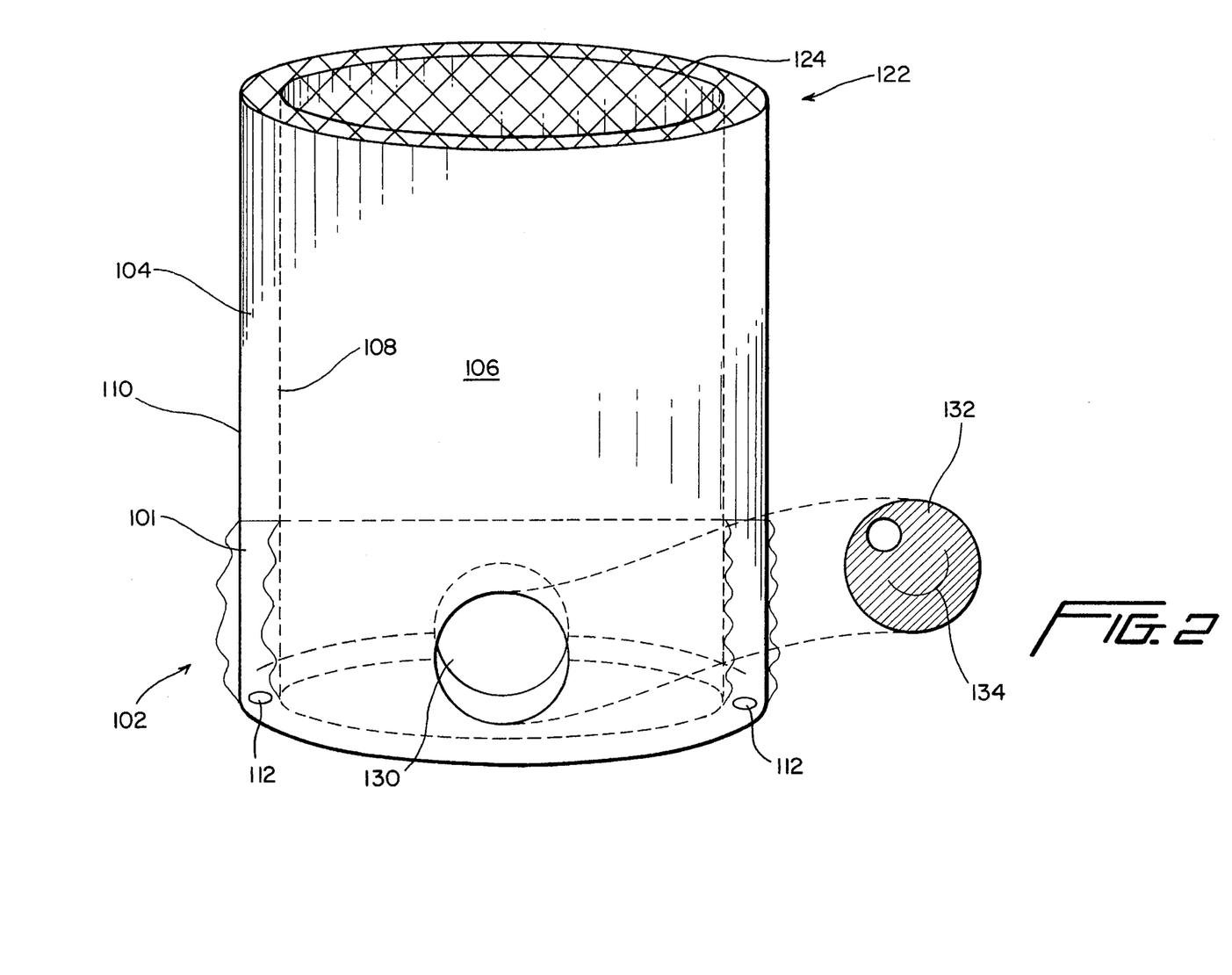
FIG. 2 is a substantially schematic elevation view of the air containment unit of the mobile ground level skydiving apparatus.
Figure 3:
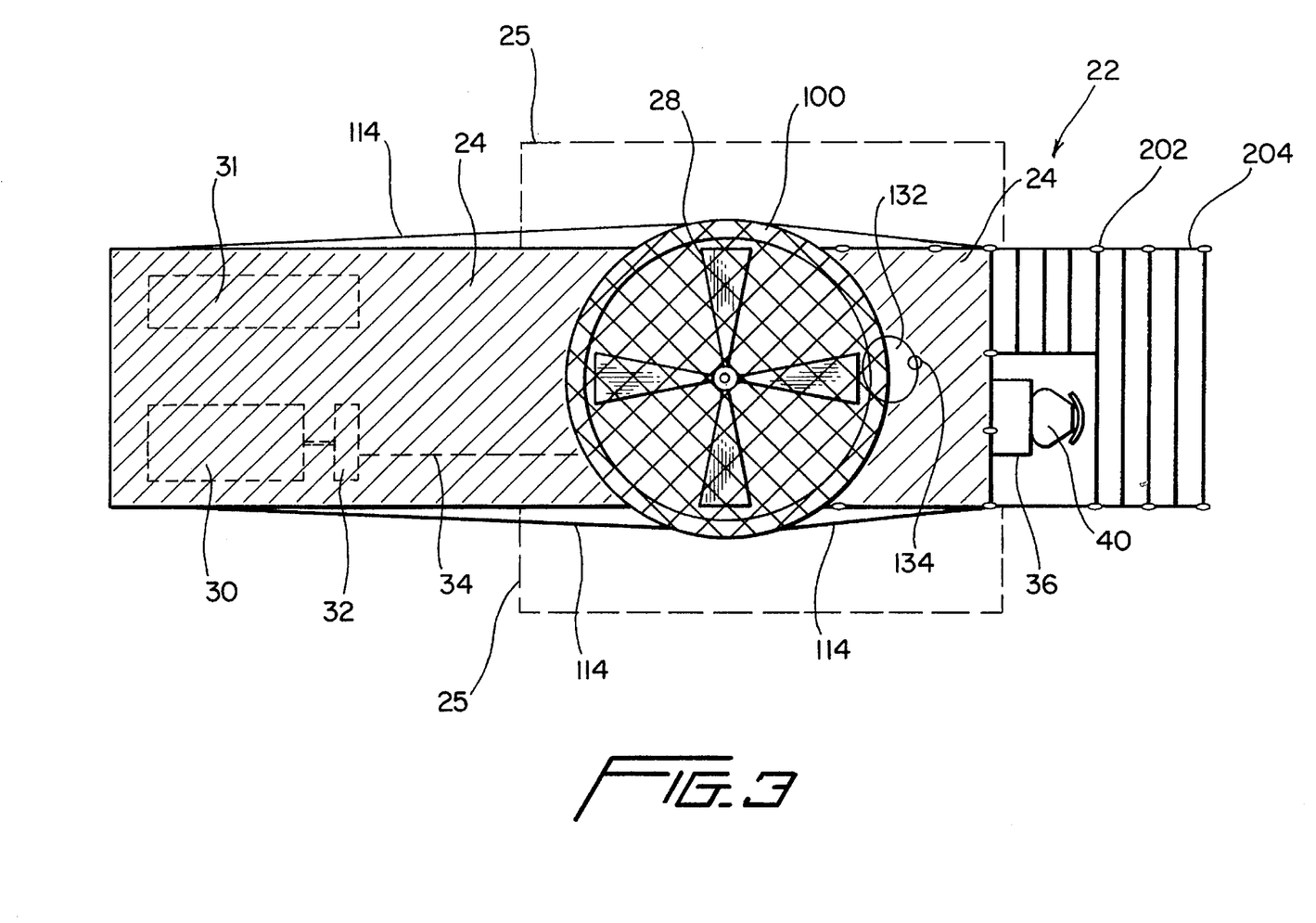
FIG. 3 is a substantially schematic top view of the mobile ground-level skydiving apparatus.

Referring now especially to FIG. 2, it can be seen that an access portal 130 is constructed near the base 102 of the air containment tube 104, and is sized to permit users to gain access to inner chamber 106 where the skydiving or freefall is to be simulated. An access portal plug 132 (see also FIG. 3) is also provided to fit into and essentially seal the access portal when the apparatus is to be operated. The access portal plug is preferably substantially spherical in shape, and is provided with a handle 134 to facilitate removal and replacement of the plug within the portal.

The seal between the portal and the portal plug need not be absolutely fluid-tight in the depicted "open" system configuration, but this seal would become more crucial in the "closed" type system, as it would be desired, in that type of system, to eliminate or minimize to the greatest extent possible, any leak of the air from the airstream. It would be desirable in the "closed" system to employ entrances and exits that operate as air locks.

Although the access portal 130 is shown as being near the base of the air containment tube 104, it is not required that this specific location be selected. Entrance and/or exit portals may be provided at any number of locations along the height of the air containment tube. Positioning the access portal 130 near the base of the tube makes it possible to shut down or idle the fan in between users, which might be advantageous whenever there could be a delay between such users, in that the subsequent user or users entering the air containment unit 100 need not rely on the airstream for support initially. The user or users can simply stand, sit or lie on the flooring means until the fan is brought up to speed.

The control panel 36 is located at the rear portion of the flatbed, enabling an operator positioned at the control panel to control all subsystems of the apparatus while simultaneously observing the user or users within the air containment tube. While this is not an absolute necessity, it is advantageous in that the operator can make adjustments using the system controls to attempt to maintain the user or users at approximately the mid-level of the vertical extent of the tube 104. The control panel is preferably equipped with sufficient controls to permit the operator to make various adjustments in the air flow parameters, such as air flow speed and/or volume, either by fan speed control, or by control of intake and/or exhaust vents for the airstream (if provided on the apparatus), with the goal being to have the user inside the tube supported only by the upward flow of air. Other air flow parameters which may advantageously be controlled by the operator in a closed system are the temperature and/or humidity of the air in the air flow stream.

At the beginning of the simulation for each user or plurality of users, the user or users must be raised from the flooring means 120 into an elevated freefall position, which may be accomplished by running the fan to generate a higher airflow speed than that which would be necessary for the freefall simulation. Likewise, at the end of the simulation, the user or users must be substantially gently lowered back to the flooring means, in order to permit egress through the access portal. Providing the operator with the ability to observe the user or users during these stages enables this process to be carried out much more efficiently and with fewer possible disruptions.

In addition to providing means for lowering the user or users back to the flooring means at the end of the simulation, it is also recognized that provision must be made to contend with inadvertent power stoppage, in order to ensure that the persons in the unit are lowered in a controlled manner in that event. It is preferable to thus provide means for ensuring that the fan 28 will undergo a gradual, extended slowdown in the event of a power failure or interruption. This may be accomplished by employing a high mass, high inertia fan itself, or through the use of energy storage means well known in the art, such as flywheels or counterweights. Alternatively, it is contemplated that a gearing system could be provided to perform the same function of ensuring a gradual, extended slow down of the fan.

Figure 4:
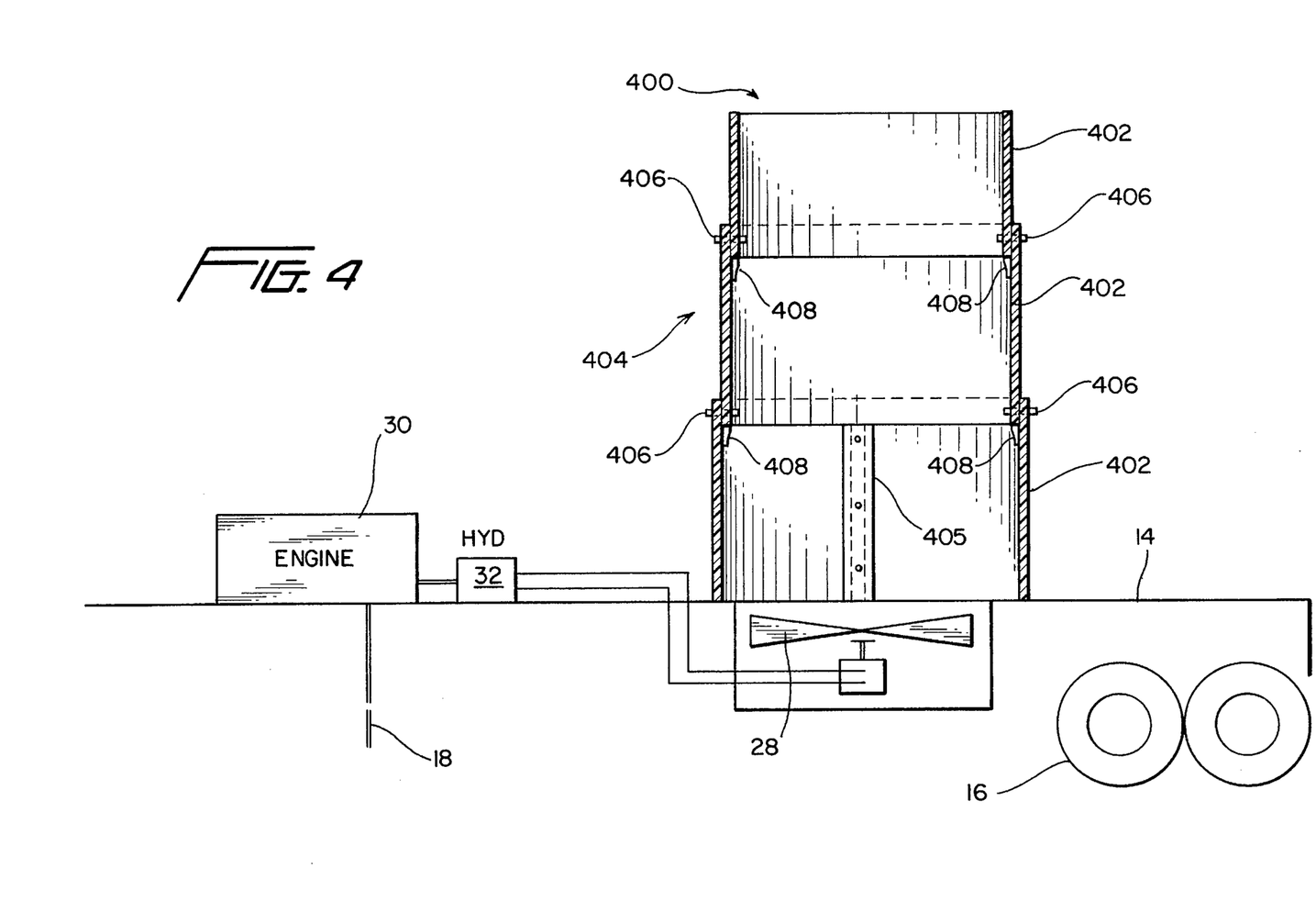
FIG. 4 is a substantially schematic elevation view of an alternative embodiment of the mobile ground level skydiving apparatus of the present invention.

An alternative preferred embodiment of the air containment unit of the present invention is depicted in FIG. 4. In FIG. 4, the air containment unit 400 is not a pliant, inflatable polymer tube 104, but is instead constructed of a plurality of rigid plastic panels 402 that are designed to be quickly assembled into an air containment tube 404 at successive locations, and later disassembled for transport.

The rigid plastic panels 402 may be formed in any number of configurations to be erected into an air containment unit, for example, four full-length quarter circular panels may be provided, together with bracket means extending the length of the erected tube to hold the edges of adjacent panels in the tubular arrangement. The panels could be disassembled and stowed in a horizontal orientation during transport.

Alternatively, as shown in FIG. 4, the plastic panels 402 may be annular in shape, and of decreasing diameter such that the assembled air containment tube 404 will be of a telescoping form. Although annular panels are the focus of the description herein, the invention is not intended to be limited to an air containment unit having a circular cross-sectional configuration. Other cross-sections, such as oval, square, rectangular, or octagonal, would be substantially equally suitable for use.

Each annular panel may itself be made up of a plurality of plastic panels, connected together by brackets, one of which is depicted at numeral 405 in FIG. 4. This same type of bracket would be employed to join full-length panels into an operational configuration of an air containment unit.

The successive upper annular panels can be secured in position through the use of pins 406 extending between the adjacent rings. In such a configuration, the escapement of air can be prevented, if necessary from a design standpoint, by providing an elastomeric seal 408 connected to the lower end of each annular ring to prevent the upwardly flowing stream of air from escaping through the space between adjacent rings. The need for the elastomeric seal 408 may be eliminated by providing a telescoping ring design in which the annular plastic panels 402 increase in diameter from the bottom of the top of air containment tube 400.

The embodiment of the air containment tube 400 employing rigid plastic panels 402 is collapsible in the sense that the tube can be quickly disassembled into transportable component parts which can be stowed on the trailer as the apparatus is moved from site to site. In the depicted embodiment, the panels may simply be lowered into concentric arrangement resting on platform 14, which would greatly reduce (to one-third or one-quarter, for example) the height of the unit from its operational configuration to a transport configuration. It will be readily understood that various plastic panel configurations and assemblies can be used in erecting an air containment tube in accordance with this embodiment of the invention.

It will further be readily apparent to those of ordinary skill in the art that other collapsible air containment means will be potential candidates for use in the present invention. Yet a further example would be the use of a single thickness (i.e., without an inflation chamber between two walls) sheet or film of pliant polymer which could be erected into an air containment unit employing rigid external supports, such as support rods or the like, wherein the rods could be lowered or removed and stowed for transport of the unit when travelling from location to location.

The power plant and drive train for the apparatus have been depicted in substantially schematic form, as the exact type of subsystem for these components is not seen to be critical to the overall operation of the apparatus, and the details of the connections and couplings required in order to drive the fan are well recognized in the art. It is preferred that a diesel engine be employed as the main power source to drive the fan system and to operate other mechanical components, such as a variable opening (louvered) flooring means 120, if such other components are provided on the apparatus. At present, the preferred embodiment of the apparatus of the present invention will include a dedicated diesel engine provided solely for use in powering the apparatus. This configuration is preferred because it will provide the best match between power output of the power plant and power requirements of the apparatus. It may be possible to employ the diesel engine (or other power plant) of the transport vehicle itself, for example, the tractor of a tractor-trailer configuration, as the power plant for the apparatus. However, because various vehicle models employ different power plants having different power outputs, it is expected that not all transport vehicles will be suitable to provide the power requirements of the apparatus.

The power plant is preferably coupled to the fan system by a drive train which preferably employs hydraulic linkages. The drive train will also preferably have suitable gearing, clutch, and controls therefor, in order to engage and control the rotation of the fan. The controls for the power plant/drive train are also preferably provided with a sufficient variability so as to permit easy modification, as necessary, of the parameters such as speed and volume of the airstream passing through the air containment unit.

The power plant need not, however, be a diesel engine. It will be readily understood that gasoline engines, turbines and electric motors would be among other suitable candidates for use as the power plant in the apparatus. Similarly, it will be readily seen that the drive train may employ mechanical linkages in place of hydraulic linkages in coupling the power plant to the fan system and other mechanical components of the apparatus. The drive train can be designed in various different ways in order to accommodate the various power plants contemplated for use in the present invention.

The foregoing description of the present invention is provided for illustrative purposes only, and variations and modifications to the depicted and described preferred embodiments may become apparent to those of ordinary skill in the art without departing from the spirit and scope of the present invention. Accordingly, the scope of the invention is to be determined by making reference to the appended claims.

What is claimed is:

1. Apparatus for the simulation of skydiving at substantially ground level comprising:

a platform operatively coupled to a means for transporting the apparatus via road transport;

means connected to said platform for generating an upwardly moving stream of air of sufficient speed and volume to support an object in said air stream;

air containment means disposed on said platform for confining said upwardly moving stream of air through a predetermined vertical distance, said air containment means having an open volume therein and being open at an upper end thereof, and being collapsible from an operational configuration extending vertically upwardly to a height of at least several feet above said platform, to a transport configuration in which the vertical projection of said air containment means is greatly reduced as compared to the height in the operational configuration, wherein said air containment means comprises an inflatable air containment unit disposed on said platform and wherein, when said air containment unit is inflated, said air containment unit takes on a substantially hollow configuration defining an inner chamber in which the skydiving simulation is accomplished.

2. Apparatus as recited in claim 1 wherein said air containment unit is made of a material which enables persons outside said unit to see through said unit into said inner chamber of said unit.

3. Apparatus as recited in claim 1 further comprising means for inflating said air containment unit.

4. Apparatus as recited in claim 3 wherein said air containment unit comprises inner and outer walls sealed to one another to define an inflation chamber.

5. Apparatus as recited in claim 4, wherein said inflating means comprises means for directing said upward flow of air into said inflation chamber of said air containment unit.

6. Apparatus as recited in claim 4 wherein said inflating means comprises a source of compressed air.

7. Apparatus as recited in claim 1 wherein said platform comprises an elevated deck constructed above a horizontal surface of said apparatus transporting means, and wherein said air containment means is secured to said elevated deck.

8. Apparatus as recited in claim 7 wherein said air stream generating means comprises a fan disposed below said elevated deck, wherein an exhaust side of said fan is in fluid communication with said open volume within said air containment unit through an opening in said elevated deck at a base of said air containment unit.

9. Apparatus as recited in claim 8, further comprising means for filtering debris from air that is drawn by said fan at an intake side thereof to be blown into said upwardly moving stream of air.

10. Apparatus as recited in claim 9, wherein said debris-filtering means comprises a first stage filter comprising a mesh skirt extending between the ground and said platform around a periphery of said platform.

11. Apparatus as recited in claim 10, wherein said debris filtering means comprises a second stage filter surrounding an intake section of said fan.

12. Apparatus as recited in claim 9, wherein said debris-filtering means is constructed of a material that will readily accept information media.

13. Apparatus as recited in claim 1 wherein said platform comprises an elevated deck constructed above a horizontal surface of said apparatus transporting means, and wherein said air containment means is secured to said elevated deck.

14. Apparatus as recited in claim 1, further comprising means for filtering debris from air that is drawn by said air stream generating means at an intake side thereof, said debris filtering means comprising a skirt which, when disposed in an operating position, extends from said apparatus to the ground at a sloping angle.

15. Apparatus as recited in claim 1 wherein said air containment unit is provided with an access portal near a base thereof, and a removable and replaceable access portal plug adapted to seal the access portal.

16. Apparatus as recited in claim 1, further comprising a flooring means disposed on said platform at a base of said air containment means for providing a lower boundary for said air containment means, said flooring means being sufficiently open to permit said upwardly flowing stream of air to pass therethrough, and wherein said flooring means further comprises means for varying an amount of open space in said flooring means.

17. Apparatus as recited in claim 16 further comprising a containment netting disposed at said upper end of said air containment means, said containment netting spanning across the opening of said upper end.

18. Apparatus as recited in claim 1 wherein said platform is also equipped with a control panel having at least one control means for enabling an operator to control at least one air flow parameter of said upwardly moving stream of air in said air containment means.

19. Apparatus as recited in claim 1 further comprising means for stabilizing said air containment means in said vertical operational configuration.

20. Apparatus as recited in claim 19 wherein said stabilizing means comprises a plurality of guy wires connected to an upper end of said air containment means and to peripheral portions of said platform.

21. Apparatus as recited in claim 1 further comprising a set of stairs, at least a lower section of which is movable from an operational position wherein said stairs extend to the ground, to a transport position on said platform, wherein said set of stairs, when in operational position, provides access to said air containment means.

22. Apparatus as recited in claim 1 further comprising means for powering said air stream generating means, wherein said powering means is mounted as a component on said apparatus.

23. Apparatus as recited in claim 1 wherein said air containment means is constructed of a material that will readily accept information media.

24. Apparatus for the simulation of skydiving at substantially ground level comprising:

a platform operatively coupled to a means for transporting the apparatus via road transport;

means connected to said platform for generating an upwardly moving stream of air of sufficient speed and volume to support an object in said air stream;

air containment means disposed on said platform for confining said upwardly moving stream of air through a predetermined vertical distance, said air containment means having an open volume therein and being open at an upper end thereof, and being collapsible from an operational configuration extending vertically upwardly to a height of at least several feet above said platform, to a transport configuration in which the vertical projection of said air containment means is greatly reduced as compared to the height in the operational configuration, and wherein said air containment means has at least one structural fastener coupled thereto, said at least one structural fastener being so constructed and arranged that said air containment means can be collapsed from said operational configuration to said transport configuration by manipulation of said structural fastener.

25. Apparatus as recited in claim 24 wherein said air containment means comprises a plurality of substantially rigid panels and means for connecting said plurality of panels together into an a vertically extending air containment unit configuration, said panel connecting means further being so constructed and arranged to permit said air containment unit to be quickly disassembled into individual panels.

26. Apparatus as recited in claim 25, wherein said plurality of rigid panels comprises a plurality of panel elements, having the same cross-sectional shape and having incrementally smaller cross-sectional dimensions, said plurality of panel elements being sized in a manner such that the panel elements may be disposed on said platform in a nested configuration, and such that said plurality of panel elements can be erected into a telescoping unit configuration, said panel elements further having means for releasably securing adjacent panel elements in said telescoping unit configuration in position relative to each other.

27. Apparatus for the simulation of skydiving at substantially ground level comprising:

a platform operatively coupled to a means for transporting the apparatus via road transport;

means connected to said platform for generating an upwardly moving stream of air of sufficient speed and volume to support an object in said air stream;

air containment means disposed on said platform for confining said upwardly moving stream of air through a predetermined vertical distance, said air containment means having an open volume therein and being open at an upper end thereof, and being collapsible, from an operational configuration extending vertically upwardly to a height of at least several feet above said platform, to a transport configuration in which the vertical projection of said air containment means is greatly reduced as compared to the height in the operational configuration, wherein said platform comprises an elevated deck constructed above a horizontal surface of said apparatus transporting means, and wherein said air containment means is secured to said elevated deck, and wherein said elevated deck includes at least one deck extension member and means for moving said at least one deck extension member from a first stored position in which the at least one member does not protrude beyond a width of the platform, to a second deployed position in which the at least one member protrudes laterally from the deck to provide a wider effective deck surface.

28. Apparatus for the simulation of skydiving at substantially ground level comprising:

a platform;

means connected to said platform for generating an upwardly moving stream of air of sufficient speed and volume to support an object in said air stream;

air containment means disposed on said platform for confining said upwardly moving steam of air through a predetermined vertical distance, said air containment means having an open volume therein and being open at an upper end thereof, and being collapsible from an operational configuration extending vertically upwardly to a height of at least several feet above said platform, to a transport configuration in which the vertical projection of said air containment means is greatly reduced as compared to the height in the operational configuration, and wherein said air containment means comprises an inflatable air containment unit.

* * * * *